(12) United States Patent
Trennepohl

(10) Patent No.: US 11,445,653 B2
(45) Date of Patent: Sep. 20, 2022

(54) EQUALIZATION MECHANISM OF MULTIPLE INTEGRAL CHASSIS WEIGHT IN AGRICULTURAL MACHINERY AND IMPLEMENTS

(71) Applicant: Stara S/A Industria De Implementos Agricolas, Nao-Me-Toque (BR)

(72) Inventor: Atila Stapelbroek Trennepohl, Nao Me Toque (BR)

(73) Assignee: Stara S/A Indústria De Implementos Agŕcolas

( * ) Notice: Subject to any disclaimer, the term of this patent is extended or adjusted under 35 U.S.C. 154(b) by 0 days.

(21) Appl. No.: 16/610,803

(22) PCT Filed: May 2, 2018

(86) PCT No.: PCT/BR2018/050142
§ 371 (c)(1),
(2) Date: Nov. 4, 2019

(87) PCT Pub. No.: WO2018/205000
PCT Pub. Date: Nov. 15, 2018

(65) Prior Publication Data
US 2020/0060059 A1    Feb. 27, 2020

(30) Foreign Application Priority Data

May 8, 2017 (BR) .................... BR102017009655-6

(51) Int. Cl.
*A01B 61/00* (2006.01)
(52) U.S. Cl.
CPC .................................. *A01B 61/00* (2013.01)
(58) Field of Classification Search
CPC ..................................................... A01B 61/00
USPC .................................. 172/1, 4; 248/648, 658
See application file for complete search history.

(56) References Cited

U.S. PATENT DOCUMENTS

| | | | |
|---|---|---|---|
| 9,936,624 B2* | 4/2018 | Nininger | A01B 63/22 |
| 10,638,653 B2* | 5/2020 | Anderson | A01B 63/22 |
| 10,798,865 B2* | 10/2020 | Fast | A01B 63/32 |
| 2014/0000919 A1* | 1/2014 | Bachman | A01B 63/24 172/4 |
| 2014/0379230 A1* | 12/2014 | Koch | A01B 63/145 172/663 |
| 2019/0141880 A1* | 5/2019 | Zemenchik | A01C 21/007 172/1 |

* cited by examiner

*Primary Examiner* — Muhammad Ijaz
(74) *Attorney, Agent, or Firm* — Barnes & Thornburg LLP

(57) ABSTRACT

The invention describes an equalization mechanism of weight between a central chassis and the side tool-bars of an agricultural machinery and implements, by distributing the weight between the central chassis and the tool-bar frame through pneumatic springs, installed in a slanted position, through specific fixing brackets between the central chassis and the tool-bar frame.

2 Claims, 2 Drawing Sheets

EQUALIZATION MECHANISM OF MULTIPLE INTEGRAL CHASSIS WEIGHT IN AGRICULTURAL MACHINERY AND IMPLEMENTS

BACKGROUND OF THE INVENTION

It is well-known that through the prior art of this technology sector that agricultural machinery and implements own wide extendable sides to fit as many row units as possible such as planting, fertilizer spreading and nutrients, etc, installed in multiple chassis, properly interconnected and connected to the main framework, which is trailed by a tractor, to perform the intended operation. Such operational structures could be enabled only this way, due to the tractor evolution process, which was increased considerably, as much in power as efficiently, operational/functional.

These row units present several component parts depending on the purpose of the agricultural machine. For instance, planters own component parts to perform planting operations successfully. Implements with other purposes, such row units present component parts that meet their purposes successfully.

The issues presented by the agricultural machinery with component parts are that the areas these machines operate are not even ones, having unevenness such as rolling terrain, slopes, lower areas, etc. Besides hardness, soil compaction, moisture etc. These factors affect the work to be done, as well as its uniformity, due to the multiple integral chassis that have different weights.

When a planter is performing an operation, for instance, shanks flotation or ground-breaker elements may happen as well as furrows that do not open to deposit seeds and as a consequence these seeds do not germinate (or do not sprout properly), hence compromise the desired productivity yield. It may happen to other types of implements as well, when component parts carry out a job and cannot perform it successfully and as a result, not being profitable.

It is known that by trying to solve these issues, systems to transfer weight were developed through mechanical springs of hydraulic actuators or by attaching weights (counterweights) to lighter modules, in order to transfer the chassis weight to another one, from the heavyweight to the lightweight one, so that the whole implement can follow terrain unevenness perfectly and evenly, while performing the intended operation.

Nevertheless, outcomes have not been satisfactory. [009] For instance, the prior art refers to Brazilian patent BR 11 2014 032214 7 de kinze, entitled. "Weight transfer system for seed planters and product applicators", which is basically and essentially, a weight transfer system through hydraulic actuators which is connected between the heavyweight chassis and lightweight by transferring the weight from the heavier to the lighter one.

SUMMARY

Thus, the novel mode of equalization mechanism of multiple integral chassis weight in agricultural machinery and implements, object of this invention, and disclosed in this descriptive application, is designed and developed to solve the issues relating to the prior art mentioned.

The objective is to characterize the novel mode of equalization mechanism of multiple integral chassis weight in agricultural machinery and implements, which ensures effective and perfect uniform implement weight distribution on the wheels.

The objective is to characterize the novel mode of equalization mechanism of multiple integral chassis weight in agricultural machinery and implements, when the referred agricultural machine is a planter, ensures the constant shanks depth penetration or ground breakers and, or ensure that such component parts do not get suspended while moving on terrain unevenness.

The objective is to characterize the novel mode of equalization mechanism of multiple integral chassis weight in agricultural machinery and implements, which provides a perfect and uniform copying of terrain unevenness.

The objective is to characterize the novel mode of equalization mechanism of multiple integral chassis weight in agricultural machinery and implements, which maintains a uniform implement weight distribution; presents a mechanism with a minimum and necessary number of components; provides a faster response rate while operating; a lower cost than conventional ones mentioned in the prior art; easy and clean maintenance of component shifting; and works regardless of the hydraulic system of the agricultural machine or implement.

The objectives intended by this invention are entirely achieved through the novel mode of equalization mechanism of multiple integral chassis weight in agricultural machinery and implements, which meets the proper use of weight compensation of pneumatic springs (compressed or expanded air) transferring the weight from one heavyweight chassis to a lightweight one, providing perfect and uniform copying of terrain unevenness, such air springs attached between the chassis through mounted and/or welded brackets. Such pneumatic springs may work independently, interconnected, as a closed system or as an active system.

DESCRIPTION OF THE DRAWINGS

The invention disclosed in this descriptive application, and whatever novel mode of the equalization mechanism of multiple integral chassis weight in agricultural machinery and implements, can be fully understood and put into practice by any technician in the technology sector, by it being explained clearly, concisely and enough to allow its reproduction, based on the attached drawings listed below.

Nevertheless, this equalization mode of mechanism of multiple integral chassis weight in agricultural machinery and implements is not supposed to be limited, to this characterization and embodiment, other possible forms of materialization may be considered, however, the objective of this invention must remain the same, as described in this application.

Figure 1:
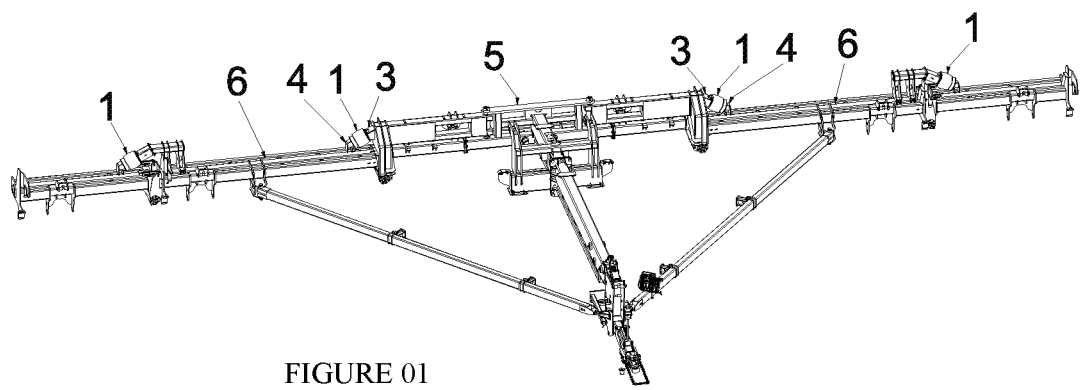
Figure 2:
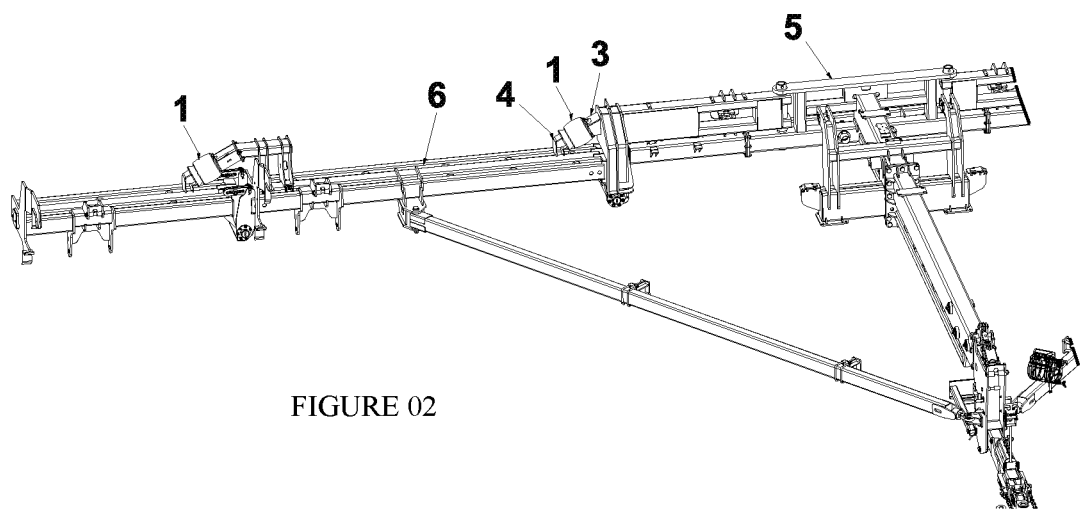
Figure 3:
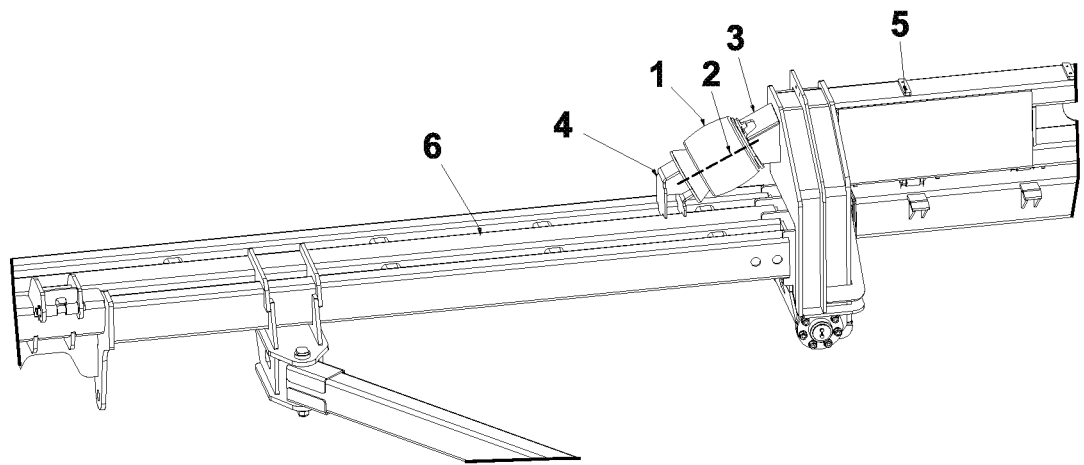
Figure 4:
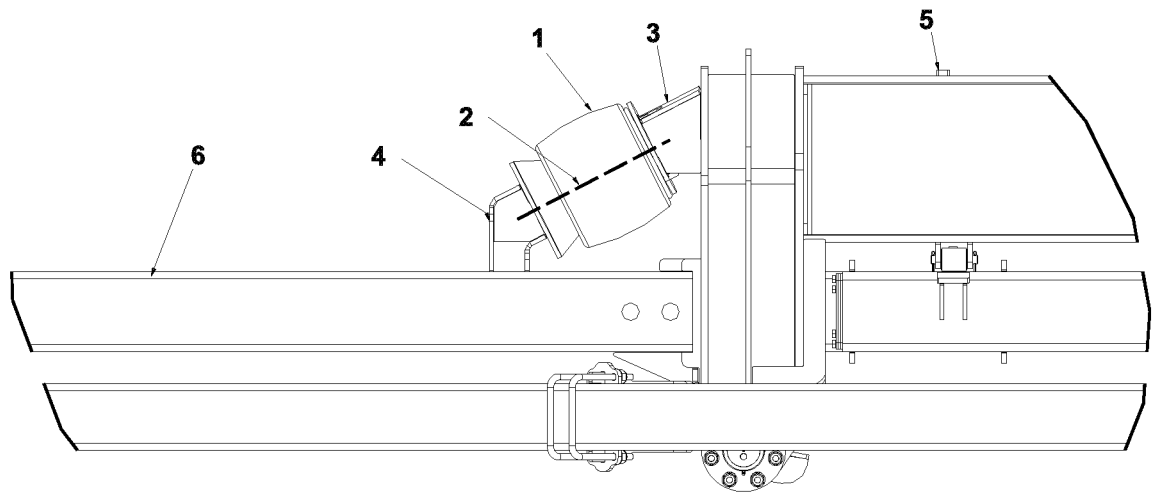
Figure 5:
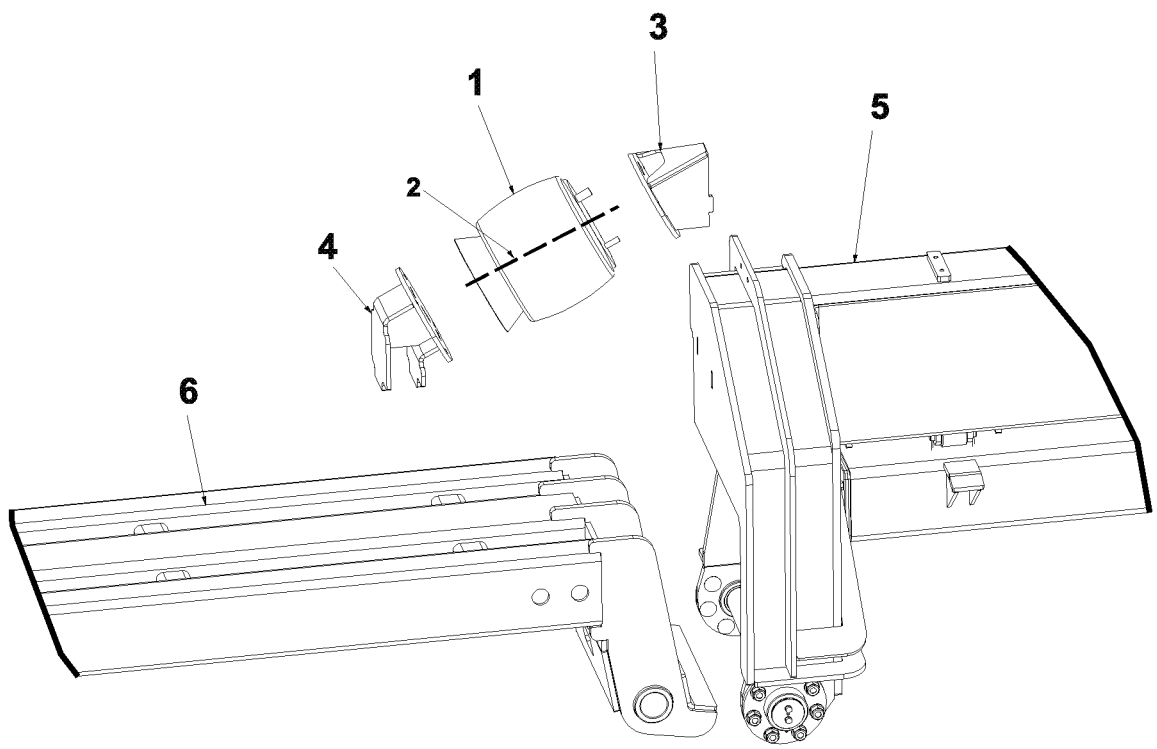

The attached drawings are described as follows:

FIG. 01 represents a front perspective view of the novel mode of equalization mechanism of multiple integral chassis weight in agricultural machinery and implements as advocated by the present invention;

FIG. 02 represents a partial front perspective view of the novel mode of equalization mechanism of multiple integral chassis weight in agricultural machinery and implements, by presenting half of that shown in the previous figure, on a larger scale;

FIG. 03 represents a partial front perspective view of the novel mode of equalization mechanism of multiple integral chassis weight in agricultural machinery and implements, by showing its installation on a larger scale;

FIG. 04 represents a front perspective view of the novel mode of equalization mechanism of multiple integral chassis weight in agricultural machinery and implements by showing its installation as well as its component parts;

FIG. 05 represents an exploded front perspective view of the novel mode of equalization mechanism of multiple integral chassis weight in agricultural machinery and implements, by showing its component parts assembly position.

DETAILED DESCRIPTION

The present invention relates generally to, the technological sector of agricultural machinery and implements, in particular, the novel mode of equalization mechanism of multiple integral chassis weight in agricultural machinery and implements. This invention aims to transfer the chassis weight from one to another of a determined agricultural implement while performing any type of work, ensuring an implement uniform weight distribution on its wheel assemblies and providing a perfect and homogeneous copying of terrain unevenness.

Effectively, the purpose of the invention is the novel mode of equalization mechanism of multiple integral chassis weight in agricultural machinery and implements, which is carefully and thoughtfully designed to aim something unique and outstanding when compared to other prior art in the technology sector known already.

As can be inferred from the analysis of the attached drawings, which integrate and support this application, the peculiar mode of equalization mechanism of multiple integral chassis weight in agricultural machinery and implements, is characterized, basically and essentially, by the proper use of pneumatic springs (1), installed slant (2), by means of specific fixing brackets (3) and (4), respectively, to the heavyweight chassis (5) and to the lightweight chassis (6) such springs (1) own a technical feature that, when pneumatically driven, they apply some force between the chassis (5) and (6), which they are interconnected to, and transfer the weight of the heavyweight chassis (5) to the lightweight one (6) by reaction, for weight equalization between them both and the weight of the machine is transferred to the wheels.

The invention is also characterized by the fact that the pneumatic springs (1), can work independently, interconnected, as a closed system or as an active system.

To conclude from all that has been described and analyzed, it is clear that the novel mode of equalization mechanism of multiple integral chassis weight in agricultural machinery and implements presented in this application as well as its features described and analyzed, achieves the objectives for which it is designed, ensuring effective, perfect and uniform distribution of the machine weight on the wheels and a perfect and uniform copying of terrain unevenness, as a consequence, avoiding waste and, boosting the production and yield of the farmer.

Thus, the present invention, the novel mode of equalization mechanism of multiple integral chassis weight in agricultural machinery and implements featured with unique characteristics, when compared to all that is known in the prior art of the technology sector.

The invention claimed is:

1. An equalization mechanism of multiple integral chassis weight in agricultural machinery and implements comprising:
   pneumatic springs between a heavyweight chassis and a lightweight chassis,
   wherein one end of each of the said pneumatic springs is fixed to the heavyweight chassis through a fixing bracket and an opposite end of each of the pneumatic springs is fixed to the lightweight chassis through a bracket, thereby equalizing a weight between the heavyweight chassis and the lightweight chassis by transferring weight from the heavyweight chassis and the lightweight chassis, and thereby transferring the weight to wheels of the agricultural machinery, and
   the equalization mechanism is characterized in that the pneumatic springs are installed in a slanted position.

2. The equalization mechanism of claim 1 wherein the pneumatic springs work independently, interconnected, and as a closed system or as an active system.

\* \* \* \* \*